United States Patent [19]

Baer

[11] 3,884,414
[45] May 20, 1975

[54] SOLAR HEATING DEVICE
[75] Inventor: Stephen C. Baer, Corrales, N. Mex.
[73] Assignee: Zomeworks Corporation, Albuquerque, N. Mex.
[22] Filed: Apr. 8, 1974
[21] Appl. No.: 458,913

[52] U.S. Cl. ............................ 236/49; 49/2; 49/31; 126/271; 236/99
[51] Int. Cl. .............................................. F24f 7/02
[58] Field of Search ............ 236/49, 35.2, 35.3, 99, 236/71; 126/271; 49/1, 2, 31

[56] References Cited
UNITED STATES PATENTS

| | | | |
|---|---|---|---|
| 1,386,781 | 8/1921 | Harvey | 126/271 |
| 2,030,350 | 2/1936 | Bremser | 126/271 X |
| 2,187,767 | 1/1940 | Akers | 236/49 |
| 2,698,570 | 1/1955 | Feinberg | 236/49 X |
| 3,121,265 | 2/1964 | Hoh | 126/270 X |

Primary Examiner—William E. Wayner
Assistant Examiner—W. E. Tapolcai
Attorney, Agent, or Firm—Townsend and Townsend

[57] ABSTRACT

Apparatus for maximizing the transfer of solar energy to the interior of a structure and minimizing heat loss therefrom. The apparatus includes at least one louver panel forming a portion of the exterior of the structure, the louver panel being pivotable about an axis passing through its center of gravity to open the panel. An interior reservoir is fixed to the interior surface of the panel so that the weight of the interior reservoir biases the panel in one direction to open it. An exterior reservoir is fixed to the exterior surface of the panel so that the weight of the exterior reservoir biases the panel in the opposite direction to close it. A tube provides fluid communication between the two reservoirs. A partially vaporized volatile fluid such as freon occupies the tube and the reservoirs. The relative proportions of liquid and vapor in the respective reservoirs are dependent upon the relative vapor pressure in the reservoirs, which is directly proportional to their temperatures. Thus, a higher temperature on the exterior of the structure or direct exposure to the sun raises the relative vapor pressure in the exterior reservoir to force liquid through the tube to the interior reservoir causing the panel to open and allow transfer of thermal energy to the interior of the structure. A higher relative temperature on the interior of the structure results in liquid being forced through the tube to the exterior reservoir to close the panel and minimize heat loss from the structure.

8 Claims, 4 Drawing Figures

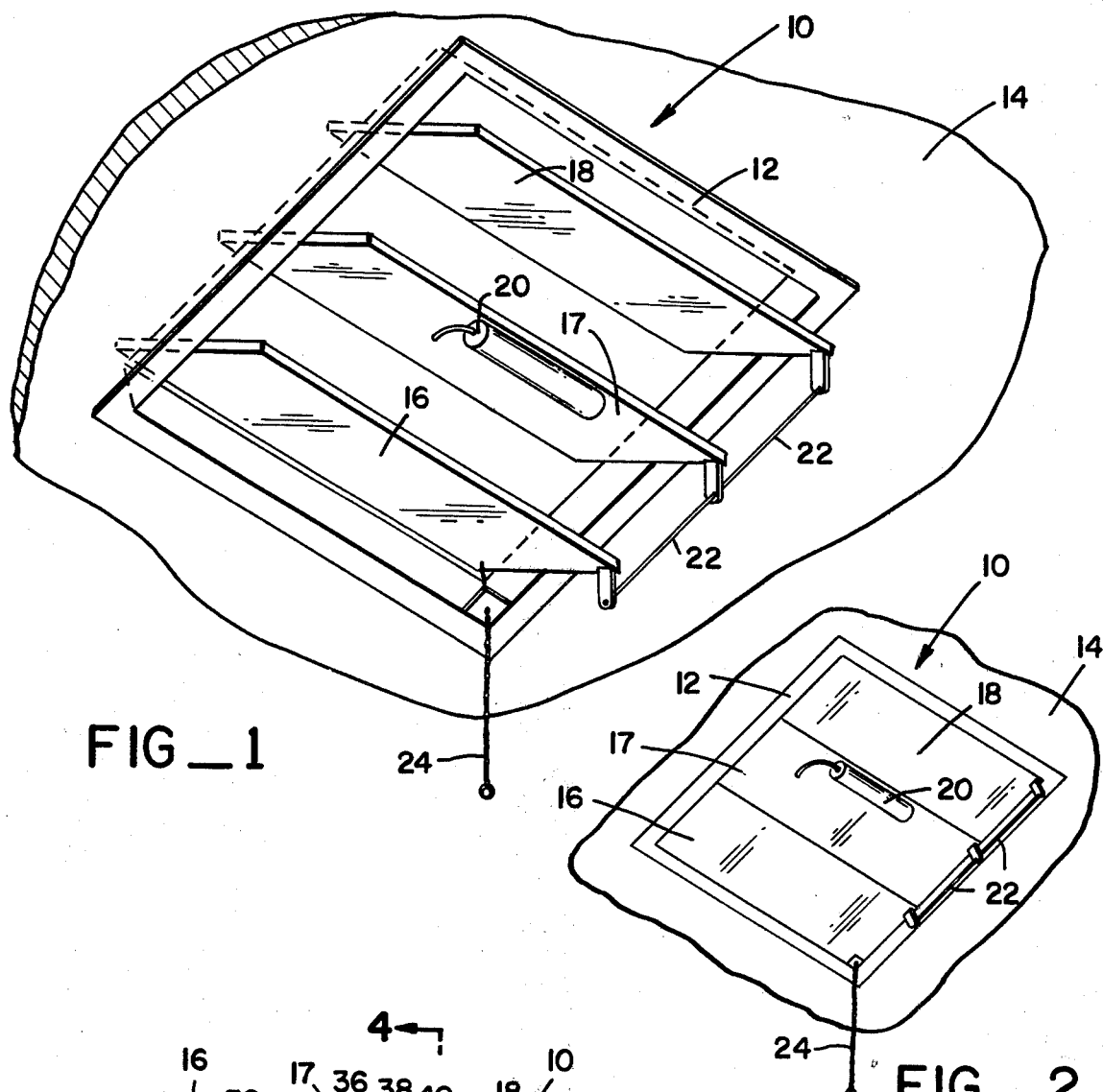
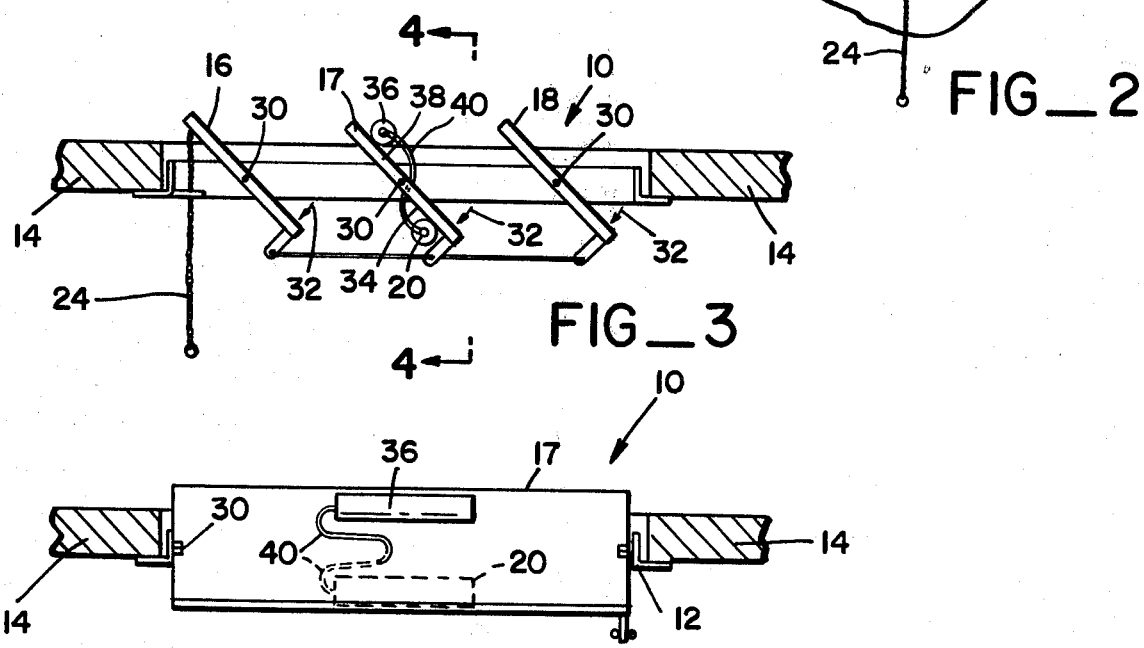

SOLAR HEATING DEVICE

BACKGROUND OF THE INVENTION

The present invention relates to a solar heating device, and in particular to apparatus for maximizing the transfer of solar energy to the interior of a structure and minimizing heat loss therefrom.

The recent and continuing energy crisis has accented the need for finding alternate means for controlling the temperature in the interior of houses and other structures. Until the energy crisis, the custom of providing structures having a large amount of glass with little or no passive ventilation had become quite commonplace. Reliance was placed upon actively air-conditioning the structure to provide cooling air and ventilation on hot days, and actively heating the structure on cold days. Such air-conditioning and heating rely primarily on fossil fuels, the supplies of which are rapidly diminishing. The need for developing mechanisms for controlling the ambient conditions inside a house or other structure without much total reliance on active heating and air-conditioning is becoming more and more apparent and urgent.

The present invention provides an apparatus which maximizes the transfer of solar energy into the interior of a structure to heat it, but minimizes heat loss from the structure when solar energy is not sufficient to provide heat. The apparatus comprises a louver panel which forms a portion of the exterior of the structure. The louver panel is preferably covered by a standard skylight but can also be directly exposed to the exterior. The louver panel is pivotable in a first direction about an axis passing through its center of gravity in order to open the panel. An interior reservoir is fixed to the interior surface of the panel on one side of its pivotable axis so that the weight of the interior reservoir biases the panel in the first direction to open it. An exterior reservoir is fixed to the exterior surface of the panel on the other side of the pivotal axis to bias the panel in a second opposite direction to close it.

A tube provides fluid communication between the two reservoirs. A partially vaporized fluid occupies the tube and the two reservoirs. The relative proportions of liquid and vapor in the respective reservoirs are dependent upon the relative vapor pressures therein which are directly proportional to the temperature of the reservoirs. A higher temperature in the exterior reservoir caused by direct exposure to the sun or the ambient temperature exterior of the structure forces liquid through the tube to the interior reservoir causing the panel to open and allow transfer of thermal energy to the interior of the structure. A relatively higher temperature on the interior of the structure forces liquid through the tube to the exterior reservoir to close the panel and minimize heat loss from the structure.

The present invention provides an apparatus which maximizes the practical utilization of solar energy. When solar energy is available to heat the structure, this heating is maximized and the structure is also ventilated if the skylight is opened. The apparatus also provides light to the interior of the structure during the day when open. Conversely, when solar energy is not available to heat the structure, heat loss from the interior of the structure is minimized. As a result, the necessity of utilizing fossil fuel or other fuels for active air-conditioning and heating of the structure is held to a minimum.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF DRAWINGS

FIG. 1 is a perspective view of the apparatus of the present invention forming part of a roof of a structure;

FIG. 2 is a perspective view similar to FIG. 1 showing the apparatus of the present invention in its closed configuration;

FIG. 3 is a side elevation schematic view of the apparatus of the present invention;

FIG. 4 is a schematic view of the apparatus of the present invention taken along lines 4—4 of FIG. 3.

DESCRIPTION OF THE PREFERRED EMBODIMENTS

The general operation of the present invention is illustrated by way of reference to FIGS. 1 and 2 in combination. Apparatus 10 includes a frame 12 which is mounted to the ceiling 14 or other wall of the structure. The ideal location for apparatus 10 is on a south facing roof which is slanted 15° to 45° from the vertical. A plurality of louver panels 16, 17, 18 are mounted in frame 12 at their respective opposite ends. Each panel rotates about an axis passing through the center of gravity of the panel and each panel is thus balanced. In order to allow the louver panels 16, 17, 18 to freely pivot with respect to the frame 12, ball bearings or other similar mountings are used to connect the panels to the frame.

One of the louver panels is provided with an interior canister 20 and an exterior canister (not visible) which controls both the opening and the closing of panel 17 as will be discussed below. In addition, tie rods 22 are provided between louver panels 16, 17, 18 so that panels 16, 18 are slaved to panel 17 and the panels open and close in unison. If desired, louver panels 16, 17, 18 can be opened manually by pulling chain 24 and locking the panels in position.

Each louver panel 16, 17, 18 is substantially impervious to the transmission of solar energy. Such panels are preferably constructed of aluminum skin having a foam core so that the panels are sturdy and provide thermal insulation but are relatively light weight. When the panels are open as in FIG. 1, solar energy can freely be transmitted to the interior of the structure, and the sunlight lights the interior of the structure. When apparatus 10 is closed as illustrated in FIG. 2, the apparatus provides a thermal insulative wall panel which retains heat inside the structure.

The operation of the apparatus 10 of the present invention is illustrated in more detail by way of reference to the schematic view of FIGS. 3 and 4. Louver panels 16, 17, 18 are pivotally attached to frame 12 along axis 30 passing through their respective centers of gravity. A skylight (not shown) is ordinarily used to cover the panels. Panels 16, 17, 18 are rotatable in a first direction as illustrated by arrows 32 to open the panels. Rotation of the panels in the opposite direction closes the panels. Interior canister 20 is mounted on the interior face 34 of louver panel 17 at one side of the pivotal axis of the panel. A corresponding exterior canister 36 is mounted on the exterior face 38 of panel 17. A tube 40 provides fluid communication between canisters 20 and 36. A volatile fluid such as freon is provided in canisters 20, 36 and occupies tube 40 as well. At ambient temperatures the freon will be partially vaporized and consist of both liquid and vapor.

When exterior canister 36 is exposed to direct sunlight or when the temperature on the exterior of structure 14 is greater than that of the interior, the internal temperature of the exterior canister will be greater than that of interior canister 20. As a result, the relative vapor pressure of canister 36 will increase, forcing liquid freon through tube 40 until the vapor pressures are stabilized. As a result, the weight of canister 36 will decrease and that of canister 20 will increase, causing louver panel 17 and slaved louver panels 16 and 18 to open as illustrated by arrows 32. In this configuration, the solar energy is transmitted to the interior of the structure. Conversely, when the internal temperature of exterior canister 36 is less than that of interior canister 20, the vapor pressure of canister 20 will be greater than that of canister 36 causing liquid freon to flow into exterior canister 36 and the window will close. Hence, the operation of apparatus 10 is automatic and is responsive to the ability of solar energy to heat the structure at any given point in time. Freon is sufficiently volatile so that the apparatus responds to 1° variation in temperature. In order to prevent overheating of the structure on extremely warm days, chain 24 can be manipulated to close louver panels 16, 17, 18 and override the action of canisters 20 and 36.

While the preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What I claim as new is:

1. Apparatus for maximizing the transfer of solar energy to the interior of a structure and minimizing heat loss therefrom, said apparatus comprising:
    a louver panel forming a portion of the exterior of the structure, said louver panel being pivotable in a first direction about an axis substantially passing through the center of gravity of said panel to open the panel;
    interior reservoir means fixed to the interior surface of the panel on one side of the pivotal axis of said panel, the weight of said interior reservoir means adapted to bias the panel in said first direction to open the panel;
    exterior reservoir means fixed to the exterior surface of the panel on the other side of the pivotal axis of said panel, the weight of said exterior reservoir means adapted to bias the panel in a second opposite direction to close the panel;
    a tube providing fluid communication between the interior and exterior reservoir means; and
    a partially vaporized fluid occupying the tube and the interior and exterior reservoir means, the relative proportions of liquid and vapor in the respective reservoir means being dependent upon the relative vapor pressure in said reservoir means, said vapor pressure being a function of the internal temperature of the associated reservoir means, a higher temperature on the exterior of the structure relative to the temperature on the interior of the structure or direct exposure of the exterior reservoir means to the sun raising the relative vapor pressure in the exterior reservoir means to force liquid through the tube to the interior reservoir means causing the panel to open to allow transfer of solar energy to the interior of the structure, a higher relative vapor pressure in the interior reservoir means resulting in liquid being forced through the tube to the exterior reservoir means to close the panel and minimize heat loss from the structure.

2. Apparatus as recited in claim 1 and additionally comprising a plurality of slaved louver panels each pivotable about an axis substantially passing through the center of gravity of each said panel, and means for connecting the slaved louver panels to the first louver panel so that pivoting of the first louver panel dependent upon the relative temperature on the interior and exterior of the structure induces corresponding pivoting motion in the slaved louver panels to open and close the slaved louver panels simultaneously with the first louver panel.

3. Apparatus as recited in claim 1 wherein the partially vaporized fluid comprises freon.

4. Apparatus for maximizing the transfer of solar energy to the interior of a structure and minimizing heat loss from the structure, said apparatus comprising:
    a plurality of louver panels forming a portion of the exterior of the structure, said louver panels being pivotable in a first direction about an axis substantially passing through the center of gravity of each said panel to open the panels, said louver panels being interconnected so that the respective panels open and close simultaneously;
    an interior canister fixed to the interior surface of one of the panels on one side of the pivotal axis of said panel, the weight of said canister adapted to bias said one louver panel in said first direction to open all said panels;
    an exterior canister fixed to the exterior surface of said one panel on the other side of the pivotal axis of the panel from the interior canister, the weight of said exterior canister adapted to bias said one louver panel in a second opposite direction to close all said panels;
    a tube providing fluid communication between the interior and exterior canisters; and
    a partially vaporized fluid occupying the interior and exterior canisters, the relative portions of liquid and vapor in the respective canisters being dependent upon the relative vapor pressure in said canisters, a higher vapor in one canister causing liquid to flow through the tube to the other canister, said vapor pressure being a function of the temperature of each said canister, whereby a higher temperature on the exterior of the structure relative to the temperature on the interior of the structure or direct exposure of the exterior canister to the sun results in a relatively higher proportion of liquid being in the interior canister causing the panel to open to allow transfer of thermal energy into the interior of the structure, a lower temperature on the exterior of the structure resulting in a relatively higher proportion of liquid being in the exterior canister causing the panel to close to minimize heat loss from the structure.

5. Apparatus as recited in claim 4 wherein the louver panels comprise a foam core, and aluminum skin covering said foam core.

6. Apparatus as recited in claim 4 wherein said louver panels are substantially planar.

7. Apparatus as recited in claim 4 wherein the partially vaporized fluid comprises freon.

8. A method for maximizing the transfer of solar energy to the interior of a structure and minimizing heat loss therefrom, said method comprising the steps of:
providing at least one pivotable louver panel forming a portion of the exterior of the structure;
providing interior and exterior reservoir means on the interior and exterior surfaces of the panel respectively, said interior and exterior reservoir means being on opposite sides of the pivotal axis of said panel so that the weight of the interior reservoir means biases the panel in one direction to open said panel, and the weight of the exterior reservoir means biases the panel in a second opposite direction to close said panel;
providing fluid communication between the interior and exterior reservoir means;
providing a partially vaporized fluid occupying the tube and the interior and exterior reservoir means;
opening the louver panel when the temperature on the exterior of the structure is greater than the temperature of the interior of the structure or when the exterior reservoir means is exposed to the sun by heating the exterior reservoir means to force a part of the liquid portion of the fluid through the tube to the interior reservoir means; and
closing the louver panel when the temperature on the interior of the structure is greater than the temperature on the exterior of the structure by heating the interior reservoir means with ambient air to force part of the liquid portion of the fluid through the tube to the exterior reservoir means.

* * * * *